United States Patent Office

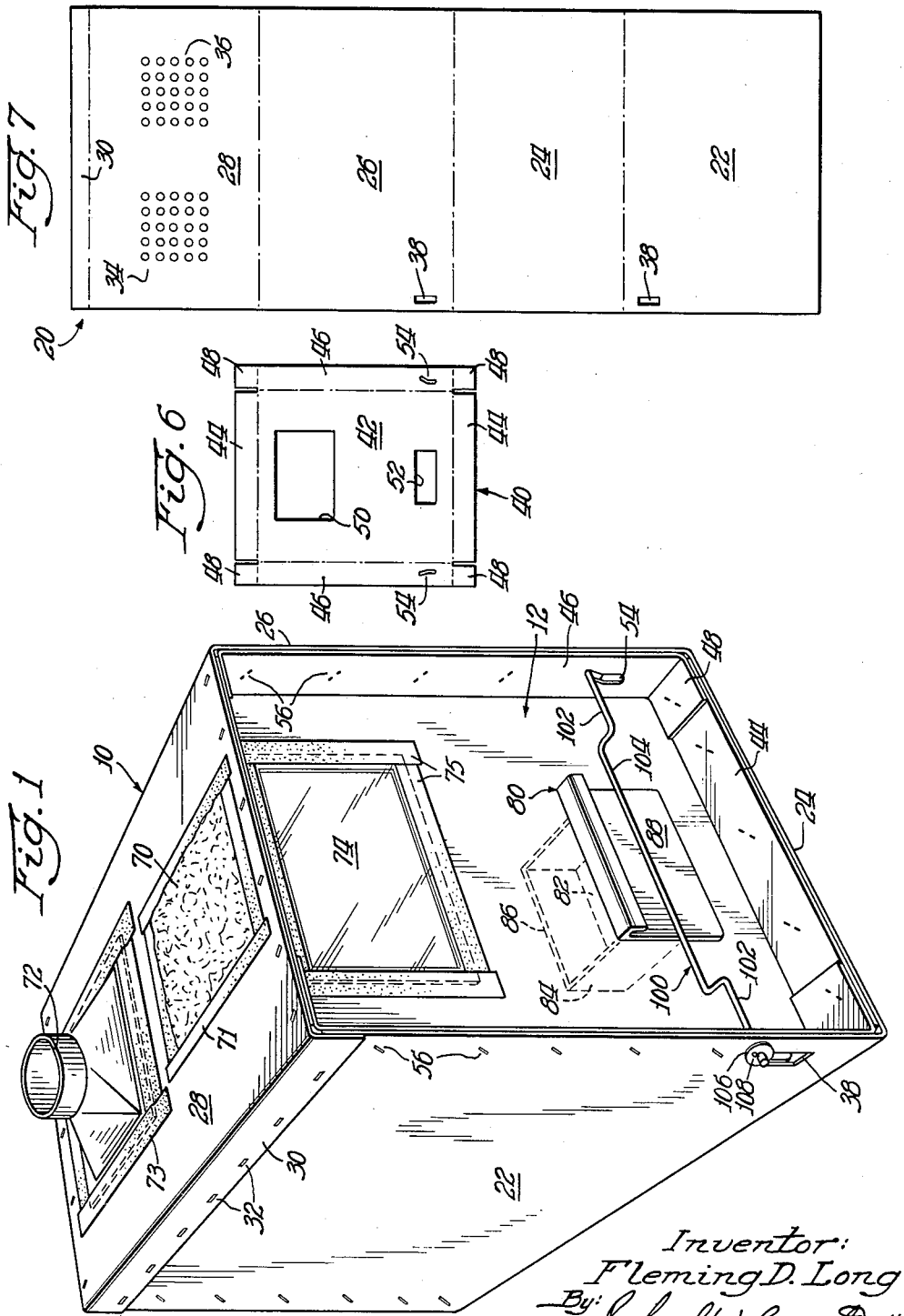

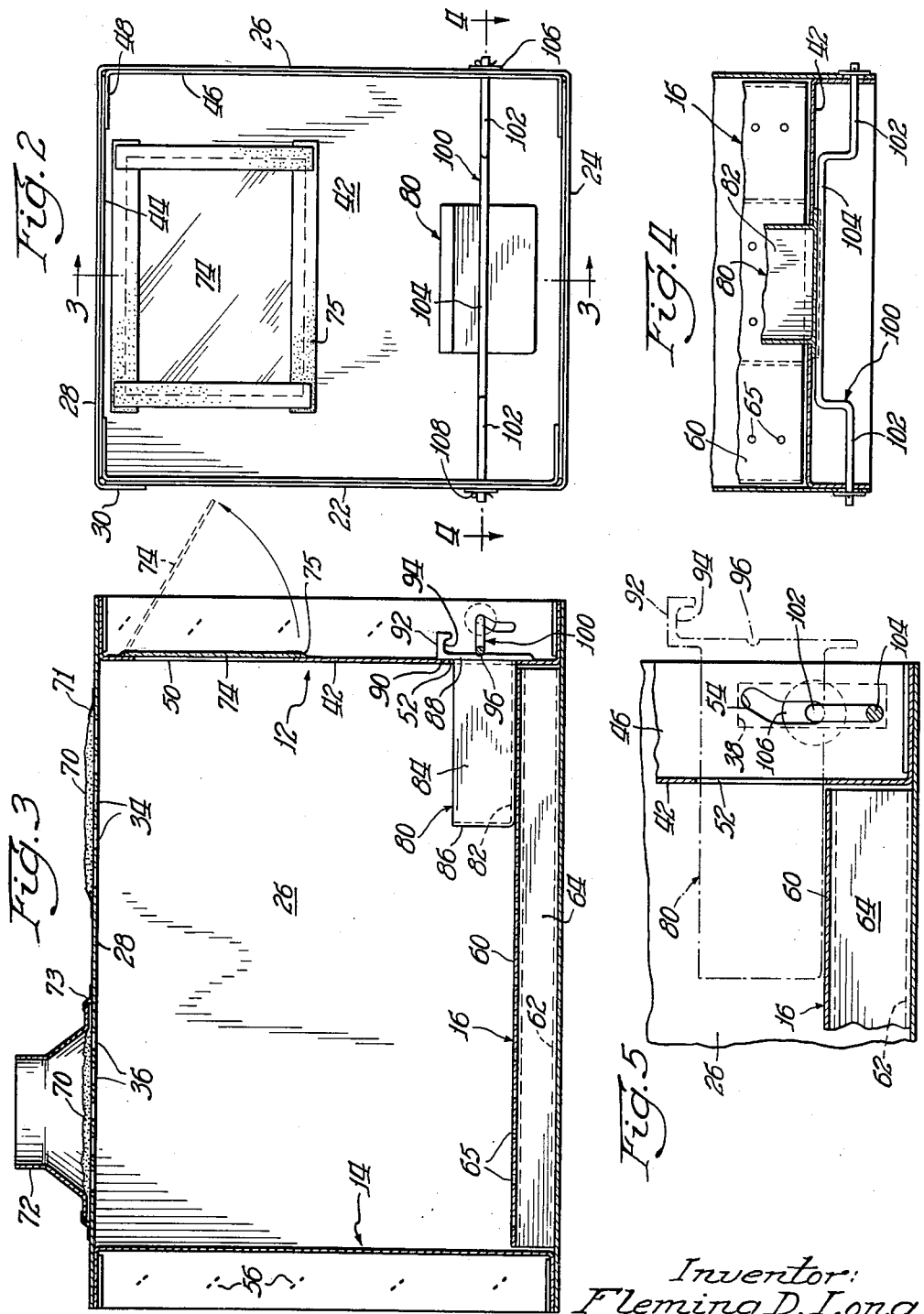

3,058,446
Patented Oct. 16, 1962

3,058,446
DISPOSABLE INCUBATOR WITH REUSABLE HARDWARE
Fleming D. Long, Monmouth, Ill., assignor to Container Corporation of America, Chicago, Ill., a corporation of Delaware
Filed Mar. 6, 1961, Ser. No. 93,498
1 Claim. (Cl. 119—30)

This invention relates to incubators, brooders, and similar equipment of the type used in the production of feeder mammals such as pigs and sheep. The invention is particularly concerned with equipment for the production of disease-free herds of animals in accordance with the method disclosed in United States Letters Patent No. 2,730,570, in which live young quadruped animals are taken from their dams by hysterectomy operations to avoid the usual contaminating influences attendant upon normal birth and rearing in order to reduce the infant mortality rate, produce healthy disease-free young animals, and provide a way of interrupting a cycle of reproduction of disease germs in such animals.

Until the present time, incubators, brooders, and other equipment for housing young animals produced by the above described method have been made of metals such as stainless steel, so as to require extensive cleaning and sterilizing operations before they can be safely reused.

Accordingly, it is the primary object of this invention to provide an incubator of the type described, in which the entire housing is formed of paperboard.

A more specific object of the invention is the provision of an incubator having a housing formed of expendable paperboard, which can be discarded after one use, and having metal feeding and venting hardware, which can be easily and inexpensively cleaned and sterilized for reuse with new paperboard housings.

These and other objects of the invention will be apparent from an examination of the following description and drawings, wherein:

FIGURE 1 is a fragmentary perspective view of an incubator arrangement embodying features of the invention;

FIGURE 2 is a front elevational view of the structure of FIGURE 1;

FIGURE 3 is a longitudinal vertical section taken on line 3—3 of FIGURE 2;

FIGURE 4 is a horizontal section taken on line 4—4 of FIGURE 2;

FIGURE 5 is an enlarged view of a portion of the structure of FIGURE 3, with the retaining bar shown in unlocked position;

FIGURE 6 is a plan view of the blank from which the front end wall of the structure of FIGURE 1 is made; and FIGURE 7 is a plan view of the blank from which the tubular body of the structure of FIGURE 1 is made.

It will be understood that, for purposes of clarity, certain elements have been omitted from certain views.

Referring now to the drawings for a better understanding of the invention, and particularly to FIGURE 1, it will be seen that the novel incubator embodying features of the invention comprises a generally tubular body, indicated generally at 10, closed at its ends by front and rear walls 12 and 14, respectively, and having internally thereof a raised floor 16, spaced vertically above the actual bottom of the incubator.

The body 10 is preferably formed from a one piece blank 20, shown in FIGURE 7, of suitable sheet material such as foldable paperboard, which has been cut and scored to provide the following panels which are hingedly connected to each other along parallel hinge lines: side wall panel 22, bottom wall panel 24, side wall panel 26, top wall panel 28, and top wall panel flap 30. When the body is set up in tubular form with a substantially rectangular cross section, the top wall panel flap 30 overlaps a portion of the side wall panel 22 and may be rigidly secured thereto in any desired manner, as for example by means of the staples 32.

As best seen in FIGURES 3 and 7, the top wall panel 28 of the housing body is provided with two groups or sets of openings spaced longitudinally of the panel from each other, the set of openings located adjacent the front end of the panel being designated 34, and the set of openings located adjacent the rear end of the panel being designated 36. Also, it will be noted that the side wall panels 22 and 26 are provided with slots 38 which, when the body is in erected form, extend vertically and are in substantial horizontal alignment with each other. The function of the sets of openings and the slots will be described later in the specification.

Each of the front and rear walls 12 and 14, respectively, of the housing is formed from a one piece blank of suitable sheet material such as foldable paperboard, and the walls are identical with each other except for the openings and slots formed in the front wall 12. The blank 40 from which the front wall is formed is illustrated in FIGURE 6 of the drawings and includes a substantially rectangular center panel 42 having identical top and bottom panels 44 hingedly attached to the upper and lower edges thereof and having identical side panels 46 hingedly attached to the side edges thereof. Hingedly attached to each end of each side panel 46 is a side panel closure flap 48, the length of which is approximately equal to the width of the adjacent top or bottom panel 44.

The center panel 42 of the front wall blank is provided with a pair of generally rectangular upper and lower openings 50 and 52, respectively, and the side panels 46 are provided with vertically extending slots 54 which are in substantial horizontal alignment with each other when the housing is in erected form.

To assemble the housing, after the body has been set-up in tubular form, the top, bottom and side panels of each of the end walls are folded outwardly 90° from the center panel to permit the insertion of the end walls within the ends of the body in such a way that the end wall side panels 46 abut the inner surfaces of the side wall panels 22 and 26 of the housing body adjacent the opposite edges of the housing body, with the side wall panel slots 38 in alignment with the side panel slots 54 of the end wall, with the top and bottom end wall panels 46 in abutting engagement with the top and bottom wall panels 28 and 24 of the housing body, and with the side panel flaps 48 of the end walls overlapping the adjacent top and bottom wall flaps of the end walls. The end walls may be secured to the body of the housing in any desired manner, as for example by means of the staples 56.

The floor or bottom pad 16 may also be formed from a single blank of foldable paperboard (not shown) which can be folded in any one of several ways to afford a horizontal top panel 60, spaced from the bottom wall panel 24 of the housing body, and a bottom panel 62, which rests on the bottom wall panel 24 and which is connected to the top panel by a plurality of vertical reinforcing webs 64 hingedly connected at opposite side edges to the top and bottom panels 60 and 62. The top panel 60 of the floor may be provided with a plurality of drain holes 65 which communicate with the space between the top and bottom panels of the floor.

In actual operation it is usually the practice to place a plurality of these incubators or brooders in rows on shelves within an enclosed room or house which is heated and ventilated to afford the proper atmospheric conditions for the animals contained therein. In order to insure that the air taken into each incubator is free of foreign material the set of openings designated 34 in the top wall panel of the housing body may be covered with a filter 70 secured in place on the top wall panel by means of the masking tape 71 to provide an air tight seal around the edge of the filter. In order to vent each incubator there is provided on the second set of openings 36 another filter 70 and a metal exhaust vent adapter 72 which is seated on the top wall panel over the filter and openings 36 and secured to the panel by means of masking tape 73 to provide an air tight seal around the adapter. It is contemplated that the adapter would be connected in any desired manner to one of a plurality of openings or pipes of a vent manifold, located above the rows of incubators, to transport the polluted air from the incubators to the outside of the room or house in which they are located.

The purpose of opening 50 in the center panel of the front wall is to afford a means of introducing the animal into the incubator and also to provide a window for viewing the animal after it has been placed in the incubator. A generally flat rectangular plate of transparent material, preferably glass, 74 is placed over the opening and secured to the front wall by means of masking tape 75 to provide an air tight seal around the opening. The window may be taped in position when the incubator is assembled, and, by removing the bottom strip of tape, the window can be raised in the manner shown in FIGURE 3 to permit introduction of the animal, after which the window glass can be lowered to its proper position and the bottom tape applied.

Feeding of the animal while in the incubator is accomplished by means of the metal feeding tray, indicated generally at 80, which comprises bottom, side, rear and front walls 82, 84, 86, and 88, respectively. The tray is inserted within the lower opening 52 in the center panel of the front wall in such a manner that the bottom wall 82 of the tray will rest on and be supported by the top panel 60 of the incubator floor.

As best seen in FIGURE 3 the front wall 88 of the feeding tray is substantially larger in cross sectional area than the rear wall so as to provide rearwardly facing abutment surface 90 which seats against the outer or forwardly facing surface of the front wall of the incubator when the tray is pushed to its innermost or closed position. Still referring to FIGURE 3 of the drawings, it will be seen that the front wall 88 of the tray is provided at its upper edge with integral forwardly projecting lip or flange 92 through which extends transversely of the wall a downwardly facing hand grip recess 94. Also, the front side of the front wall 88 of the tray presents a transversely extending groove 96 which is located approximately midway between the upper and lower extremities of the front wall of the tray.

After the tray has been inserted into the openings 52 of the incubator front wall it may be maintained in this position by means of the transversely extending metal retaining bar indicated generally at 100, which is generally cylindrical in shape and has a pair of axially aligned end portions 102 interconnected by an offset center portion 104. As best seen in FIGURE 4 when the tray and bar are in position the ends of the end portions 104 of the bar are disposed to extend through the slots 38 and 54 of the side wall panels and side panels of the housing body and front wall, respectively. Axial movement of the bar out of position may be prevented by the use of washers 106 and cotter pins 108 disposed at opposite ends of the bar outwardly of the side wall panels of the housing body.

As best seen in FIGURE 5, at their upper extremities the slots 54 in the front wall side panels slope upwardly and forwardly. The purpose of this is to permit the movement of the retaining bar into and out of locking position. In order to lock the tray into position the ends of the bar are moved to the uppermost positions within the slots 54 and the bar is rotated in a clockwise direction, as seen in FIGURE 3, until the center portion of the bar is disposed within the groove 96 in the front wall of the tray. The spacing of the slots relative to the front wall of the container is so arranged to permit a snug fit with the retaining bar to insure a spring-like action as the bar is snapped into and out of locking position. To release the bar to permit removal of the tray the bar is rotated in the opposite direction and the center portion is moved out of and away from the groove 96 to its lowermost position, shown in FIGURE 5, to permit the removal of the tray from the incubator housing. Thus, because all of the component parts of the incubator except the vent exhaust adapter, tray, and retaining bar are formed of expendable products, the cost saving of this type of incubator, as compared with a permanent all metal incubator, is substantial. The total cost of this type of incubator, including the cost of assembly, is less than the cost of the labor and materials which are required to clean and sterilize a permanent type of incubator.

I claim:

A sanitary incubator-brooder type container for use in the production of relatively disease-free young animals comprising, in combination:

(a) an expendable enclosed housing structure formed of paperboard;

(b) said housing structure including ventilating means for controlling the passage of air into and out of said structure;

(c) said structure including a vertically disposed side wall having a tray receiving opening extending therethrough at a lower portion thereof;

(d) a reusable tray formed entirely of a non-moisture absorbent material capable of being sterilized;

(e) said tray having a cross-sectional area of the same contour but of slightly lesser cross-sectional area than said opening and inserted into said opening and including a front wall having a peripheral flange projecting from the side edges thereof;

(f) said flange presenting a vertical surface disposed in face-to-face, parallel, abutting engagement with the portion of the surface of said wall surrounding said opening when the tray is disposed within said housing structure to limit inward movement of said tray and provide a seal between said structure and tray; and (g) a tray retaining member movably carried by said structure in locking engagement with said tray to releasably retain said tray within said structure.

References Cited in the file of this patent
UNITED STATES PATENTS

| | | |
|---|---|---|
| 1,878,459 | Bliss et al. | Sept. 20, 1932 |
| 1,979,877 | Hane | Nov. 6, 1934 |
| 1,986,501 | Conway et al. | Jan. 1, 1935 |
| 2,025,310 | Schaefer | Dec. 24, 1935 |
| 2,881,733 | Young et al. | Apr. 19, 1959 |